United States Patent
Yang

(10) Patent No.: US 12,480,324 B1
(45) Date of Patent: Nov. 25, 2025

(54) SCUM REMOVAL DEVICE

(71) Applicant: Zhengjin Yang, Zhejiang (CN)

(72) Inventor: Zhengjin Yang, Zhejiang (CN)

( * ) Notice: Subject to any disclaimer, the term of this patent is extended or adjusted under 35 U.S.C. 154(b) by 0 days.

(21) Appl. No.: 19/086,363

(22) Filed: Mar. 21, 2025

(30) Foreign Application Priority Data

Jan. 24, 2025 (CN) .......................... 202520168728.9
Feb. 20, 2025 (CN) .......................... 202520277433.5

(51) Int. Cl.
*E04H 4/12* (2006.01)
*C02F 1/40* (2023.01)

(52) U.S. Cl.
CPC .............. *E04H 4/1263* (2013.01); *C02F 1/40* (2013.01)

(58) Field of Classification Search
CPC ................................. E04H 4/1263; C02F 1/40
USPC .............................. 210/167.2, 242.3, 170.05
See application file for complete search history.

(56) References Cited

U.S. PATENT DOCUMENTS

| | | | |
|---|---|---|---|
| 3,428,178 A * | 2/1969 | Nash ..................... | E04H 4/1272 210/242.1 |
| 4,325,150 A * | 4/1982 | Buddy .................. | E04H 4/1272 D23/209 |
| 2010/0230336 A1* | 9/2010 | Davies .................. | E04H 4/1263 210/167.2 |
| 2015/0247332 A1* | 9/2015 | Norberto, III ........ | E04H 4/1263 210/167.2 |

FOREIGN PATENT DOCUMENTS

| | | | | |
|---|---|---|---|---|
| KR | 20060010509 A | * | 2/2006 | |
| KR | 101323839 B1 | * | 10/2013 | ................ C02F 1/24 |
| KR | 101863078 B1 | * | 5/2018 | ................ C02F 1/40 |

OTHER PUBLICATIONS

Machine-generated English translation of KR 20060010509, generated on May 29, 2025.*
Machine-generated English translation of KR 101323839, generated on Sep. 8, 2025.*
Machine-generated English translation of KR 101863078, generated on Sep. 8, 2025.*

* cited by examiner

*Primary Examiner* — Fred Prince

(57) ABSTRACT

A scum removal device, configured to placed inside water. The scum removal device includes a scum removal body and a floating assembly. The scum removal body includes a housing and a filter structure, the housing defines a filtering chamber therein, and the housing has an inlet port and an outlet port, the inlet port and the outlet port respectively communicates with the filtering chamber, and the filter structure is arranged in the filtering chamber; the floating assembly is arranged on the housing, the floating assembly defines a floating chamber, and the floating chamber is configured to enable the housing to float in the water; when the housing floats in the water, at least a portion of the inlet port is positioned below a water surface of the water.

19 Claims, 18 Drawing Sheets

SCUM REMOVAL DEVICE

CROSS REFERENCE TO RELATED APPLICATIONS

The present application claims the priority of Chinese patent application No. CN202520168728.9, filed on Jan. 24, 2025 and Chinese patent application No. CN202520277433.5, filed on Feb. 20, 2025.

FIELD

The present disclosure relates to the field of scum removal in the water, and particularly to a scum removal device.

BACKGROUND

Leaves or other floating debris are prone to fall into the water to form scum. A scum removal device is often used to filter out the scum. The existing scum removal devices are generally configured as a wall-mounted design, attached to the pool wall by a support, when in use, the user needs to adjust the length of the support to adapt to water bodies of different depths, which is inconvenient. In addition, as the frequency of adjustments and usage duration increases, the support tends to break more easily.

SUMMARY

A scum removal device, configured to placed inside water. The scum removal device includes a scum removal body and a floating assembly. The scum removal body includes a housing and a filter structure, the housing defines a filtering chamber therein, and the housing has an inlet port and an outlet port, the inlet port and the outlet port respectively communicates with the filtering chamber, and the filter structure is arranged in the filtering chamber; the floating assembly is arranged on the housing, the floating assembly defines a floating chamber, and the floating chamber is configured to enable the housing to float in the water; when the housing floats in the water, at least a portion of the inlet port is positioned below a water surface of the water.

BRIEF DESCRIPTION OF THE DRAWINGS

To provide a clearer illustration of the technical solutions in the embodiments of the present disclosure or in the prior art, a brief introduction will be given to the drawings used in the description of the embodiments or the prior art. It is obvious that the drawings described below are merely some embodiments of the present disclosure, and for those skilled in the art, other drawings can be obtained based on these drawings without creative efforts.

REFERENCE NUMERALS IN THE DRAWINGS

Figure 1:
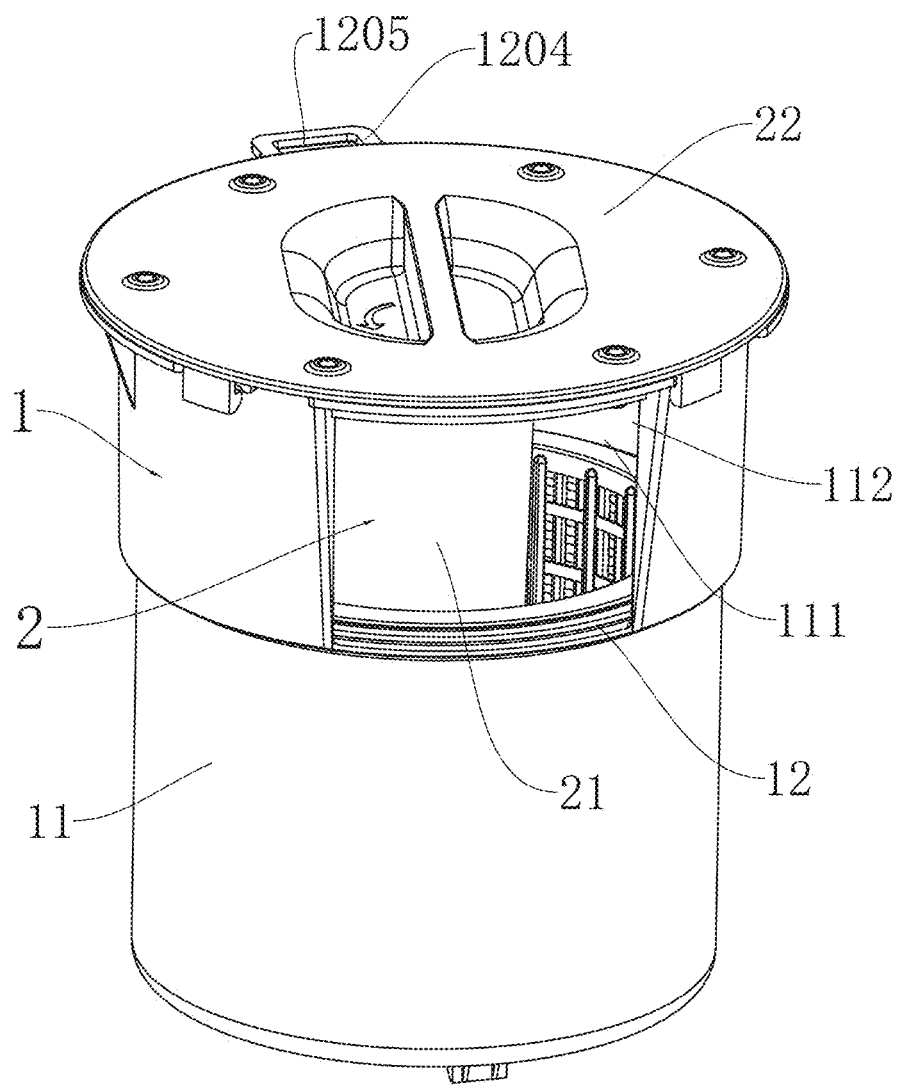
FIG. 1 is a structural schematic view of a scum removal device according to an embodiment of the present disclosure.

1, scum removal body; 11, housing; 12, filter structure; 121, filter frame; 1211, first frame body; 1212, first frame border; 122, expansion frame; 1221, second frame body; 1222, second frame border; 123, flexible filter mesh; 124, mesh openings; 125, drainage gap; 111, filtering chamber; 112, inlet port; 1121, two ends; 113, side wall; 114, bottom surface; 115, wall surface; 116, top end; 1162, second flange; 117, snap; 1171, elastic portion; 1172, protrusion portion; 118, first connecting member; 119, stepped surface; 120, outlet port; 1201, pipe connector; 1202, clipping hooks; 2, floating assembly; 21, lower floating shell; 211, columnar structure; 2111, connecting end; 2112, inserting end 212, plate structure; 2121, sealing groove; 2122, first flange; 213, second floating chamber; 214, first floating chamber; 215, inner floating wall; 216, outer floating wall; 22, upper floating shell; 221, annular protrusion; 222, side; 223, edge; 224, snap slot; 2241, first rim; 22411, first outer side; 2242, second rim; 22422, second outer side; 2243, first notch; 2244, second notch; 2245, guiding step; 225, second connecting member; 23, sealing member; 24, fasteners; 25, handle; 251, first concave portion; 252, second concave portion; 253, ridge; 26, floating chamber; 3, pipe; 31, inlet end; 32, outlet end; 4, pump; 5, counterweight element; 1203, central axis; 2123, first end surface; 21111, second end face; 6, water; 61, water surface; 1204, boss; 1205, through hole.

DETAILED DESCRIPTION

Unless otherwise defined, all technical and scientific terms used herein have the same meaning as commonly understood by those skilled in the art to which this disclosure belongs. The terms used in the description of the application herein are intended for describing particular embodiments only and are not intended to limit the present disclosure. In the description, claims, and the above drawings of the present disclosure, the terms "comprising" and "having", as well as their variants, are intended to convey a non, exclusive inclusion. The terms "first", "second", etc., as used herein, are intended to distinguish between different objects, rather than to describe a particular order.

Reference to "embodiments" herein implies that a particular feature, structure, or characteristic described in connection with an embodiment may be included in at least one embodiment of the present disclosure. The appearance of the phrase at various places in the specification does not necessarily refer to the same embodiment, nor is it a separate or alternative embodiment that is mutually exclusive of other embodiments. One skilled in the art would explicitly and implicitly understand that the embodiments described herein can be combined with other embodiments.

In order to enable those skilled in the art to better understand the technical solutions of the present disclosure, the technical solutions in the embodiments of the present disclosure will be clearly and completely described below with reference to the accompanying drawings.

Figure 2:
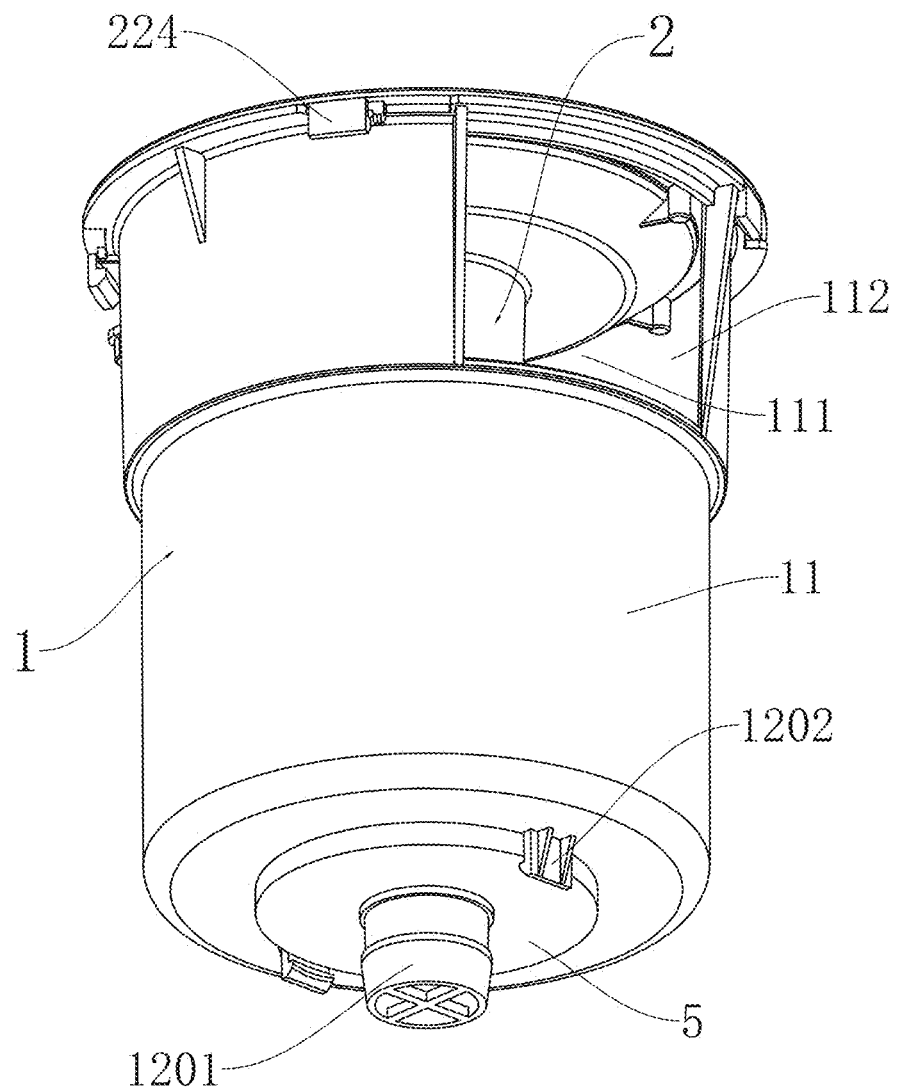
FIG. 2 is another structural schematic view of the scum removal device according to an embodiment of the present disclosure.
Figure 12:
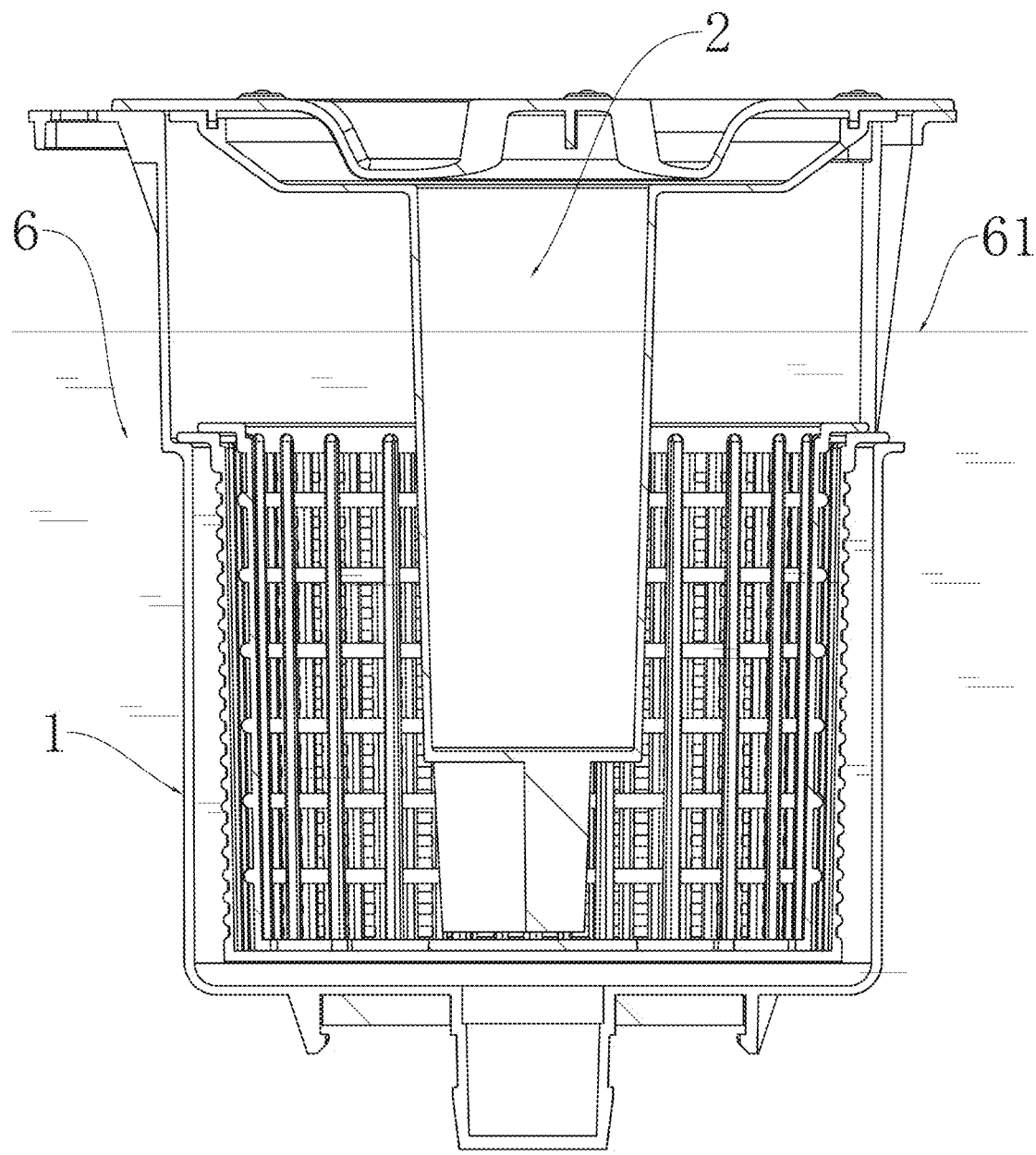
FIG. 12 is a usage scenario view of the scum removal device according to an embodiment of the present disclosure.

In order to solve the above technical problems, as shown in FIG. 1, FIG. 2 and FIG. 12, a scum removal device includes a scum removal body 1, the scum removal body 1 includes a housing 11 and a filter structure 12. The housing 11 defines a filtering chamber 111 therein, and the housing 11 has an inlet port 112 and an outlet port 120, the inlet port 112 and the outlet port 120 respectively communicates with the filtering chamber 111. The filter structure 12 is arranged in the filtering chamber 111 and is disposed between the inlet port 112 and the outlet port 120. When in use, water 6 flows into the filtering chamber 111 through the inlet port 112, after being filtered by the filter structure 12, purified water is discharged through the outlet port 120, while scum is retained within the filter structure 12. The scum removal device further includes a floating assembly 2 arranged on the housing 11. The floating assembly 2 includes a floating chamber 26, the floating chamber 26 is filled with gas or lightweight material to generate buoyancy, such that the buoyancy of the scum removal body 1 is greater than gravity, thereby enabling the scum removal device to remain afloat on the water 6. The gas may be air, and the lightweight materials include foam plastic, sponge, plastic honeycomb, paper honeycomb, and so on. When the housing 11 floats in the water 6, at least a portion of the inlet port 112 is positioned below the water surface 61 of the water 6. In some embodiments, a lower portion of the inlet port 112 is positioned below the water surface 61 of the water 6, in this way, the water near the water surface 61 of the water 6 flows in through the inlet port 112. The scum such as leaves float at water surface 61, and the inlet port 112 is arranged at a higher position than the outlet port 120, facilitating the water to be discharged smoothly. With the assistance of the floating assembly 2, the scum removal device according to the present disclosure is able to float up and down in response to the fluctuations of the water 6. By installing the floating assembly 2, the scum removal device can filter scum from the water 6 efficiently without a fixation of a support, while maintaining stability and ease of operation of the device.

In an embodiment of the present disclosure, as shown in FIG. 1 and FIG. 2, the scum removal body 1 has a gravity center, and the floating assembly 2 has a buoyant center, the buoyant center (a central point where the buoyant force acts) of the floating assembly 2 is located on or substantially on a vertical line that passes through the gravity center of the scum removal body 1, In this way, the scum removal device is able to remain a vertical suspension state in the water 6. For example, when users play in a pool, the water 6 of the pool may be waved, and water wave may hit the scum removal body 1. In some embodiments, the buoyant center of the floating assembly 2 is located at a higher position than the gravity of the scum removal body 1 thereof, such that the scum removal body 1 can return to the vertical suspension state quickly after being hit by the water wave, which enhances the stability of the device. It should be understood that, the housing 11 and the filter structure 12 may be configured as symmetrical structures, such as cylindrical structures, symmetrical prismatic structures, or other structures with symmetrical properties. Symmetrical structures ensure that the gravity center is located on a central axis 1203 of housing 11, enabling the central axis 1203 to coincide with the vertical line, such that the control of the relative position between the buoyancy center and the gravity center is improved. Either a single floating assembly 2 or multiple floating assemblies 2 can be installed on or within the housing 11, as long as the single floating assembly 2 or multiple floating assemblies 2 are evenly disposed on the scum removal body 1. Each floating assembly 2 provides buoyancy to keep the scum removal body 1 suspended in the water 6. The floating assembly 2 can be arranged by various manners, ensuring that the buoyancy center is located on or substantially on the same vertical line as the gravity center of the scum removal body 1, and therefore, the risk of tilting or capsizing of the scum removal body 1 is significantly reduced, thereby stabling the vertical suspended state.

Figure 3:
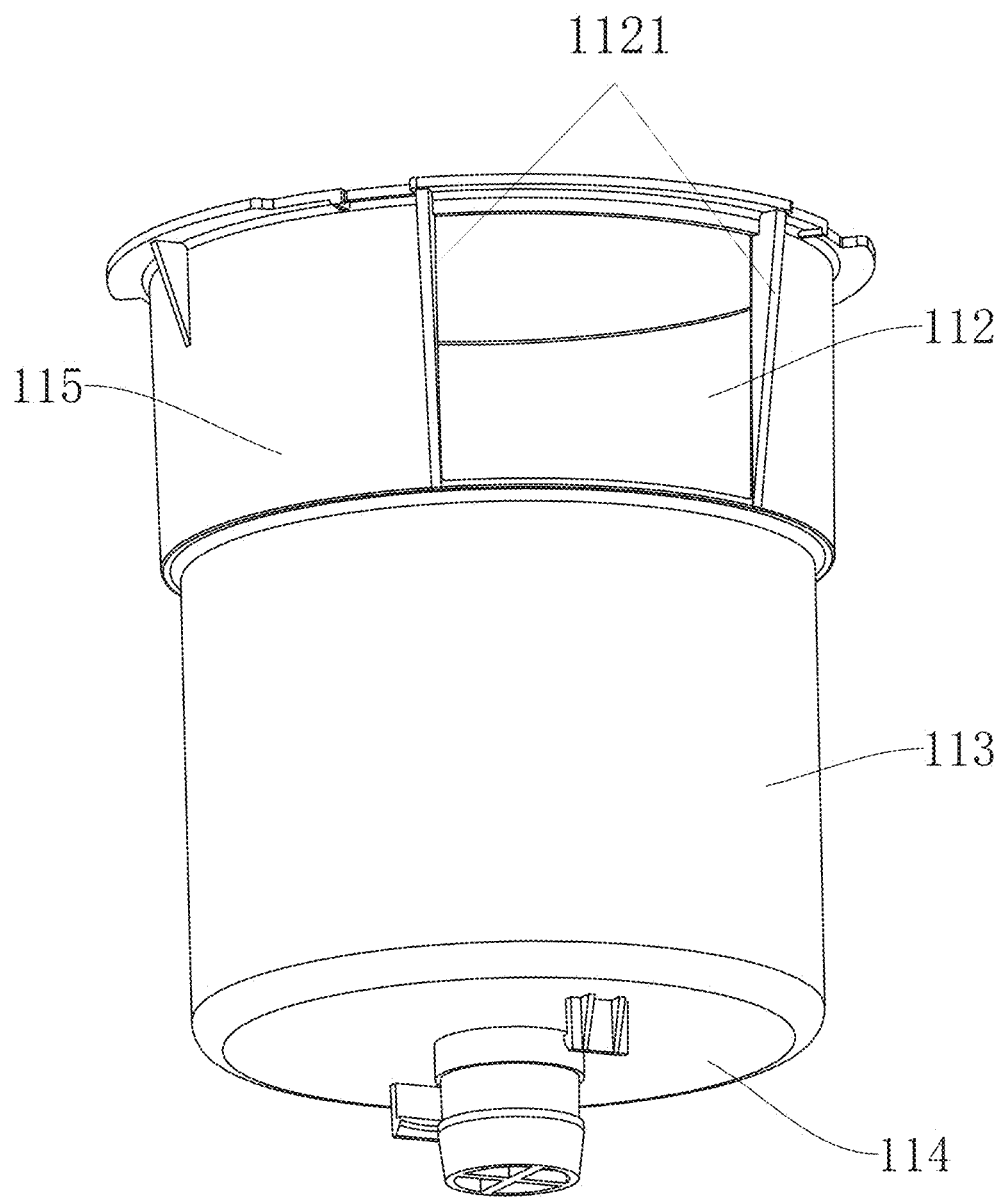
FIG. 3 is a structural schematic view of a housing according to an embodiment of the present disclosure.
Figure 8:
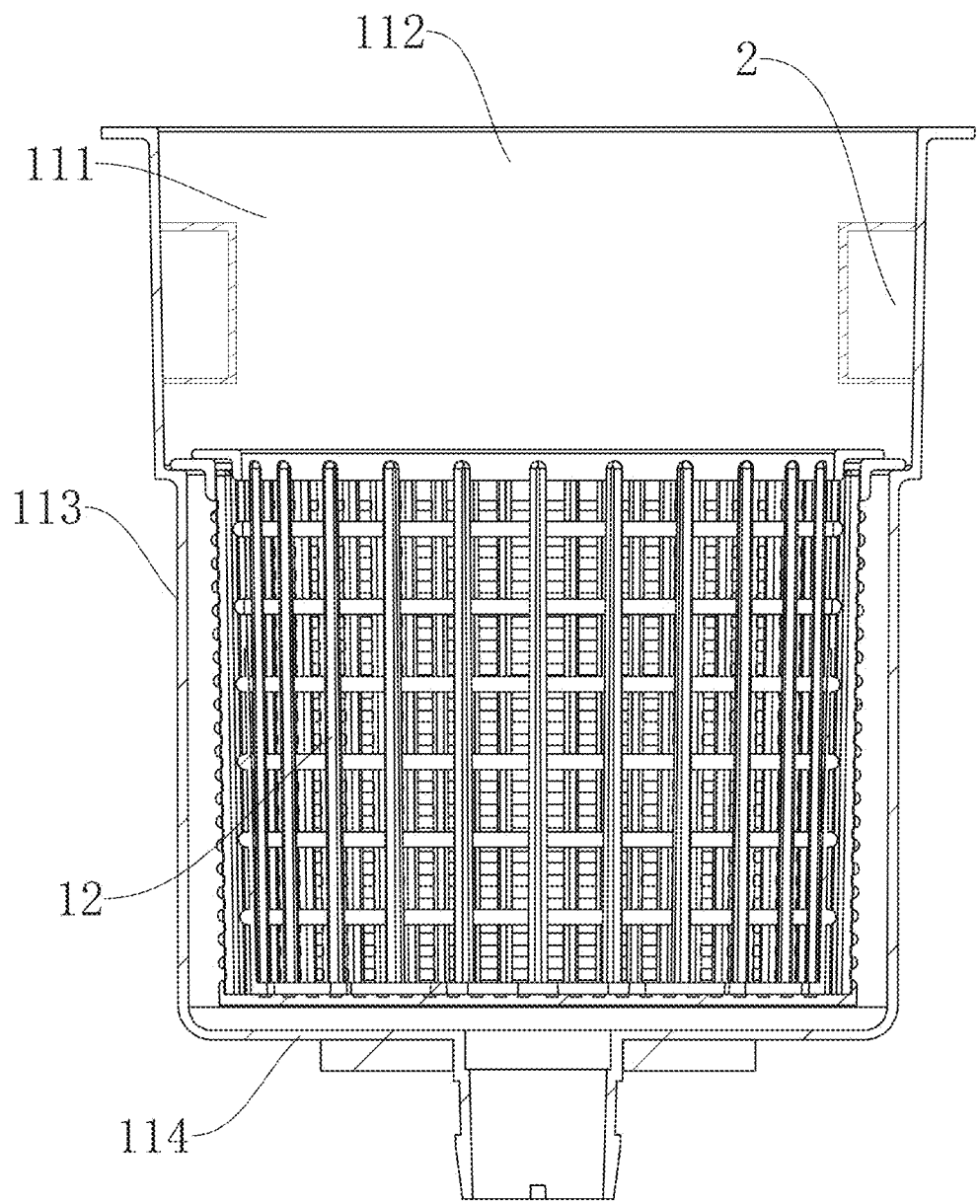
FIG. 8 is a sectional schematic view of the scum removal device according to an embodiment of the present disclosure.

In an embodiment of the present disclosure, as shown in FIG. 3 and FIG. 8, a side wall 113 and a bottom surface 114 cooperatively form the housing 11, and at least one inlet port 112 is defined on the side wall 113. The inlet port 112 is configured to introduce the water 6 into the filtering chamber 111 inside the housing 11, such that removing the scum from the water can be performed. Specifically, the inlet port 112 is defined on the side wall 113 with two ends 1121, each end of the two ends 1121 oppositely extends to the other end of the two ends 1121, forming a wall surface 115, at least a portion of the wall surface 115 is higher than a water inlet section of the inlet port 112, thereby preventing the scum that enters the inlet port 112 from flowing, due to the fluctuations of the water 6, to any direction other than the inlet port 112. It should be understood that, when multiple inlet ports 112 are provided, each inlet port 112 is distributed on the side wall 113. In an embodiment, the multiple inlet ports 112 are evenly distributed around the side wall 113, thereby ensuring the housing 11 to be symmetrical. In addition, the inlet port 112 may be defined on a top opening of the side wall 113, the side wall 113 and the bottom surface 114 cooperatively form the housing 11, a top end 116 of the housing 11 has an opening that serves as the inlet port 112, allowing the water 6 to flow into the interior of the housing 11.

Figure 9:
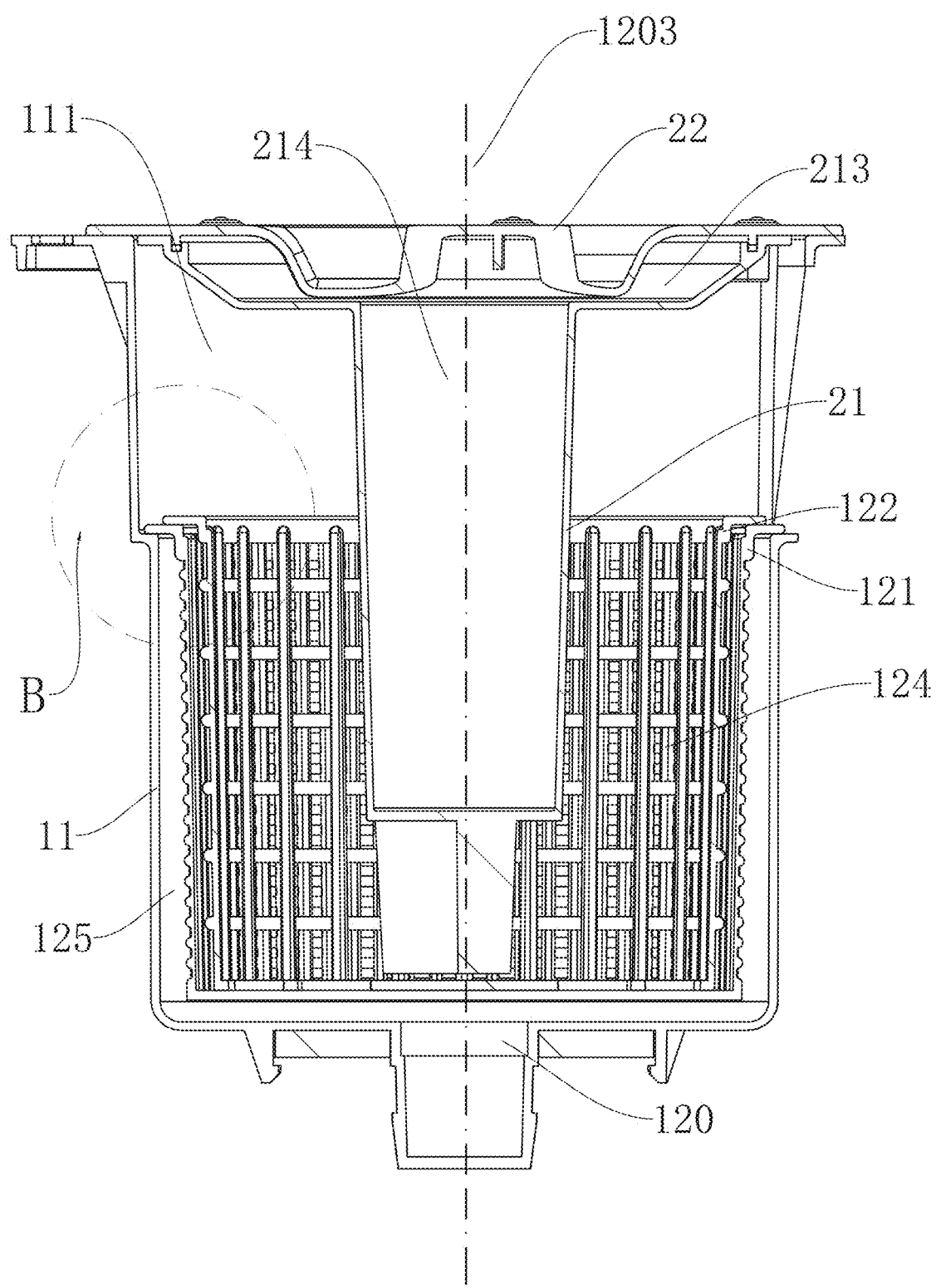
FIG. 9 is another sectional schematic view of the scum removal device according to an embodiment of the present disclosure.

In an embodiment of the present disclosure, as shown in FIG. 9, a first floating chamber 214 that extends along a depth direction of the water 6, the first floating chamber 214 serves to adjust buoyancy in a vertical direction, enabling the scum removal device to keep balance in a depth direction of the water 6, and preventing tilting or capsizing of the scum removal body 1. A second floating chamber 213 that extends along a direction substantially perpendicular to the depth direction of the water 6, thereby adjusting buoyancy in a laterally direction, enhancing the stability of the scum removal device in a horizontal direction, and effectively withstanding the lateral forces due to the fluctuations of the water 6 or external disturbances. In accordance with actual application needs, the scum removal device may include either the first floating chamber 214 or the second floating chamber 213. With an independent installation of the first floating chamber 214 or the second floating chamber 213, the scum removal body 1 can also stably remain in the suspension state. In other embodiments, the floating assembly 2 may be configured as a hollowed annular structure, an arcuate structure or a vertical strip-shaped structure, defining a floating chamber 26 inside the floating assembly 2. In addition, the hollowed annular structure, the arcuate structure or the vertical strip-shaped structure is attached to the side wall 113 of the housing 11, such that the scum removal body 1 can maintain in the suspended state.

In an embodiment of the present disclosure, as shown in FIG. 8 and FIG. 9, the first floating chamber 214 extends into the filtering chamber 111, to enable the floating assembly 2 to be integrated assembled with the scum removal body 1, such that the floating assembly 2 is positioned within the filtering chamber 111 stably and provides buoyancy for the scum removal device. When the floating assembly 2 is configured as an annular structure, an arcuate structure or a vertical strip-shaped structure, the floating chamber 26 can be arranged either within the filtering chamber 111 of the housing 11 or outside the housing 11. An inter layer can be defined between the floating assembly 2 and the side wall 113 of the housing 11, and the floating chamber 26 is positioned within the inter layer. In some embodiments, a plurality of floating assemblies 2 may be provided in the side wall 113 of the housing 11, and the plurality of the floating assemblies 2 are evenly arranged at intervals with each other, enabling the housing 11 to be symmetrical, which facilitates providing even buoyancy, such that the housing 11 can be suspended vertically and stably in the water 6. When the inlet port 112 is positioned at the top of the housing 11, with the housing 11 configured as a symmetrical structure such as a barrel-shaped structure, the gravity center of the housing 11 is concentrated on the central axis 1203, such that the scum removal device can maintain a uniform buoyancy distribution, due to the plurality of assemblies 2 being evenly distributed on the side wall 113 of the housing 11, thereby avoiding tilting or capsizing caused by uneven buoyancy.

In an embodiment of the present disclosure, as shown in FIG. 9, the first floating chamber 214 communicates to the second floating chamber 213, which facilitates generating uniform buoyancy between the first floating chamber 214 and the second floating chamber 213, thereby preventing the scum removal device from tilting or becoming unstable due to the buoyancy concentrating in a particular area. When the first floating chamber 214 and the second floating chamber 213 are filled with gas, after the scum removal device is subjected to external disturbances (such as the impact of water flow or changes of water level), the gas can rapidly adjust the pressure distribution in the first floating chamber 213 and the second floating chamber 214, thereby adjusting the buoyancy distribution and achieving a dynamic balance, reducing the fluctuation of the scum removal device. It should be understood that, the first floating chamber 214 or the second floating chamber can be installed individually, in this case, the first floating chamber 214 and the second floating chamber 213 are not in communication with each other, and the first floating chamber 214 extends in the depth direction of the water 6, while the second floating chamber 213 extends along a direction substantially perpendicular to the depth direction of the water 6.

In an embodiment of the present disclosure, as shown in FIG. 9, the housing 11 is configured as a barrel-shaped structure, the barrel-shaped structure is symmetrical, and is capable of concentrating the gravity center on or substantially on the central axis 1203. The first floating chamber 214 extends along the central axis 1203 of the housing 11, thereby ensuring the stability and symmetry of the scum removal device, facilitating maximizing the use of the internal space of the housing 11 to provide a sufficient space for the filter structure 12. The housing 11 can be configured as other symmetrical structures, such as a polyhedron, an approximate sphere, or a hemisphere, etc.

Figure 5:
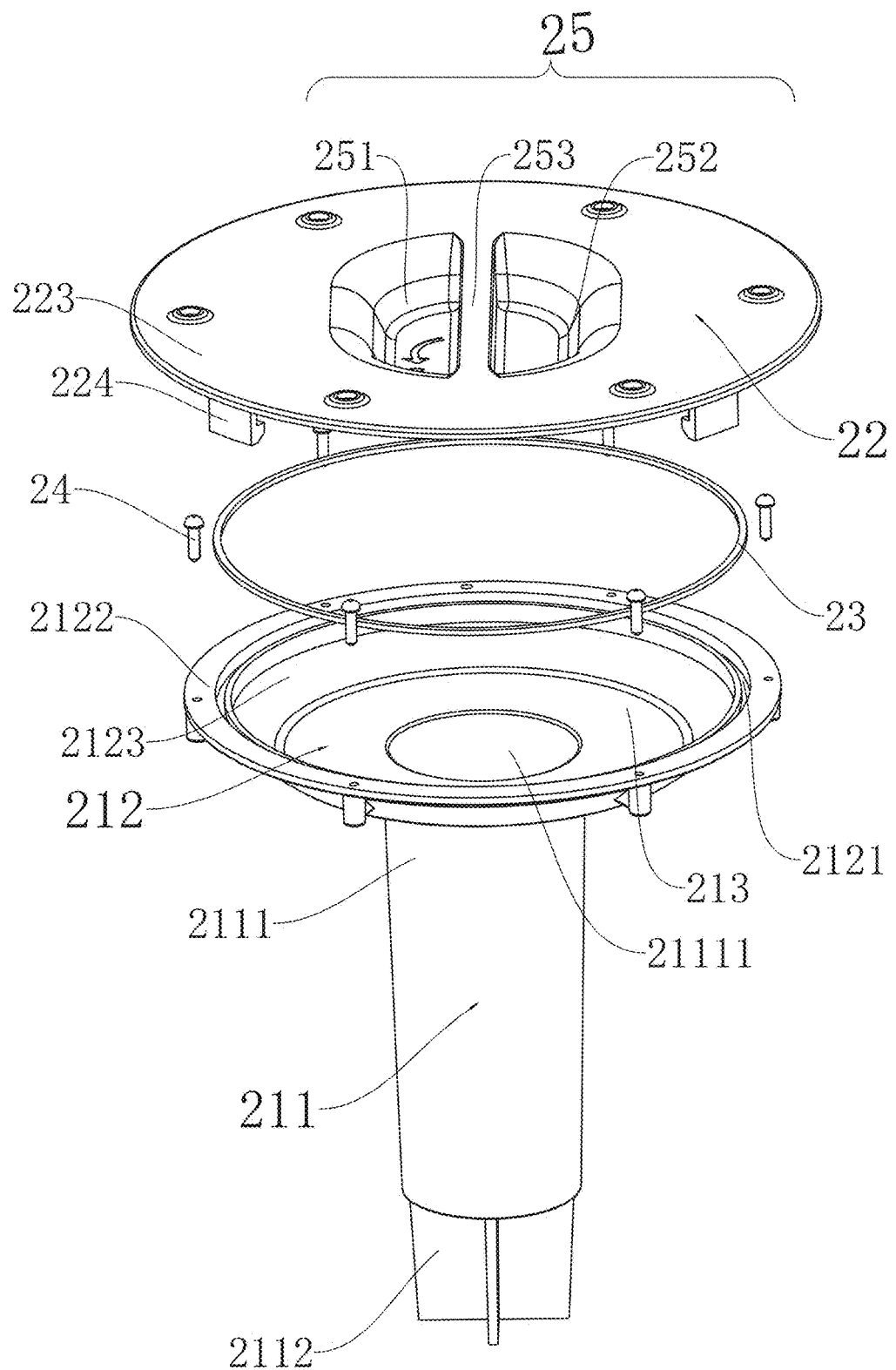
FIG. 5 is an exploded view of a floating assembly according to an embodiment of the present disclosure.
Figure 6:
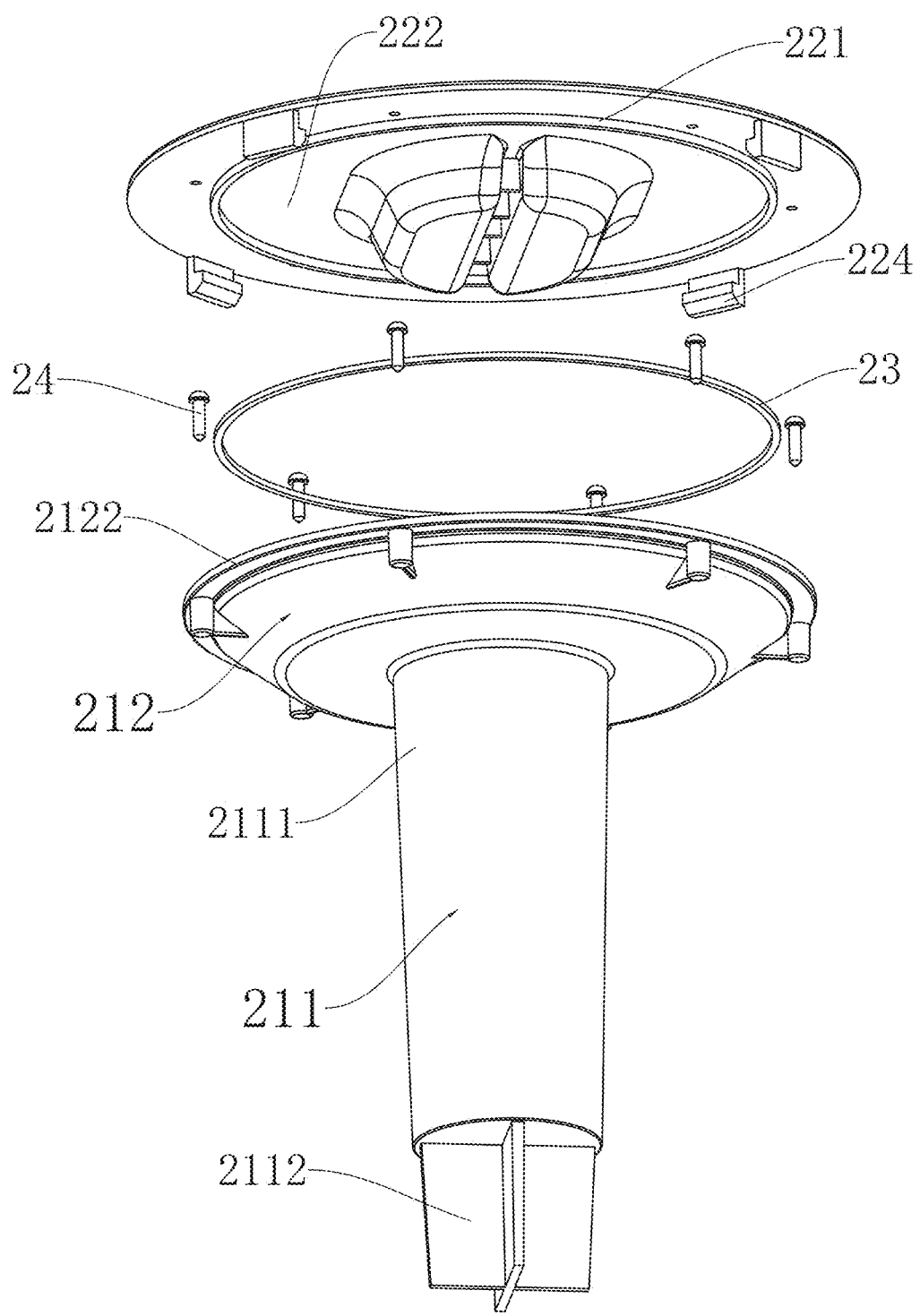
FIG. 6 is another exploded view of the floating assembly according to an embodiment of the present disclosure.

In an embodiment of the present disclosure, as shown in FIG. 5 and FIG. 6, the floating assembly 2 includes an upper floating shell 22 and a lower floating shell 21, the upper floating shell 22 and the lower floating shell 21 together define the floating chamber 26. The upper floating shell 22 covers the housing 11, such that the floating assembly 2 is able to be installed on the housing 11, and the upper floating shell 22 provides protection for the interior structure. The lower floating shell 21 extends downward into the filtering chamber 111, allowing a sufficient space to contain air or lightweight materials, resulting in a more concentrated structure for the scum removal device.

Figure 4:
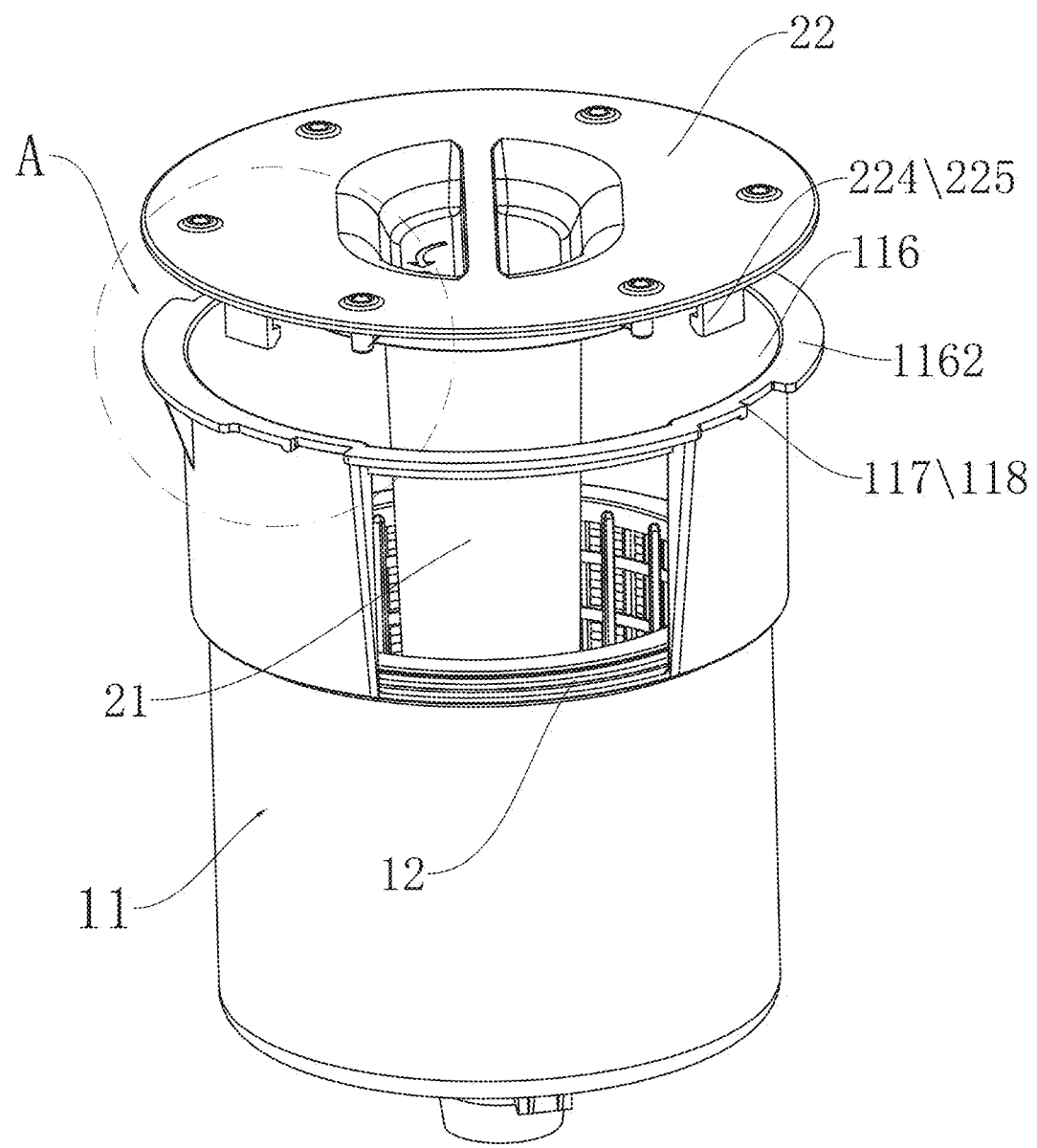
FIG. 4 is an exploded view of a portion of the scum removal device according to an embodiment of the present disclosure.

In an embodiment of the present disclosure, as shown in FIG. 4-6, the lower floating shell 21 includes a columnar structure 211 with a hollow interior, and the first floating chamber 214 defined within the hollow interior of the columnar structure 211, to contain gas or lightweight materials, thereby providing the necessary buoyancy for the scum removal device. The columnar structure 211 may be configured as a cylinder, a prism or other symmetric structure. The top end 116 of housing 11 has an opening to facilitate the installation and positioning of the columnar structure 211. Specifically, the columnar structure 211 is inserted in the filtering chamber 111 through the opening on the top end 116 of housing 11. It should be understood that when the inlet port 112 is defined in the side wall 113 of the housing 11, the columnar structure 211 is arranged to be inserted into the filtering chamber 111, thereby ensuring the inlet port 112 to keep unobstructed for water inlet.

In an embodiment of the present disclosure, as shown in FIG. 5, the lower floating shell 21 further includes a plate structure 212. The columnar structure 211 includes a connecting end 2111 and an inserting end 2112. The plate structure 212 has a first end surface 2123 that facing the upper floating shell 22, and the area of the first end surface 2123 is greater than the area of a second end face 21111 of the inserting end 2112. The second floating chamber 213 is defined between the upper floating shell 22 and the plate structure 212, and configured as a flat chamber. The upper floating shell 22 is sealingly connected with the plate structure 212, to provide a tight seal between the first floating chamber 214 and the second floating chamber 213, such that water entering the first chamber 214 and the second chamber 213 caused by the fluctuations of the water 6 is prevented. The second floating chamber 213 not only helps reduce the weight of the floating assembly 2, increasing the buoyancy of the scum removal device, but also provides additional adjustment of buoyancy. For example, filling the second floating chamber 213 with lightweight materials can further adjust and optimize the buoyancy distribution of scum removal device.

In an embodiment of the present disclosure, as shown in FIG. 5 and FIG. 9, the connecting end 2111 of the lower floating shell 21 has an opening to communicate with the first floating chamber 214 of the columnar structure 211. The plate structure 212 is arranged above the connecting end 2111, and also configured to define an opening, such that the second floating chamber 213 is able to communicates with the first floating chamber 214, thereby facilitating generating uniform buoyancy between the first floating chamber 214 and the second floating chamber 213, and preventing the scum removal device from tilting or becoming unstable due to the buoyancy concentrating in a particular area.

In an embodiment of the present disclosure, as shown in FIG. 5 and FIG. 6, a side 222 facing the plate structure 212 of the upper floating shell 22 is arranged with an annular protrusion 221. The annular protrusion 221 serves as a clamping structure, facilitating the sealing member 23 being fit into a sealing groove 2121 tightly. Correspondingly, the plate structure 212 defines the sealing groove 2121 to receive the sealing member 23. The sealing member 23 is compressed to position between the annular protrusion 221 and the sealing groove 2121 to achieve sealing. In an embodiment, the sealing member 23 is made from rubber or other materials with properties of elasticity and water resistance, thereby achieving a reliable seal when the sealing member 23 is compressed by the annular protrusion 221. The annular protrusion 221, the sealing groove 2121, and the sealing member 23 together enhance the seal between the lower floating shell 21 and the upper floating shell 22, thereby preventing water from entering the floating chamber 26. In other embodiments, the annular protrusion 221 can be arranged on the plate structure 212, and the sealing groove 2121 is correspondingly defined on the upper floating shell 22. It should be clarified that the sealing member can be configured as an O-ring or a gasket, and the seal is not restricted to the installing of the sealing member 23, using sealant between the upper floating shell 22 and the plate structure 212 can also achieve a tight seal.

In an embodiment of the present disclosure, as shown in FIG. 5 and FIG. 6, a portion of the plate structure 212 horizontally extends outward to form a first flange 2122. Correspondingly, the edge 223 of the upper floating shell 22 is configured to be horizontal, thereby allowing the edge 223 to mate with the first flange 2122. The floating assembly 2 further includes a plurality of fasteners 24, the plate structure 212 has a first flange 2122, each of the plurality of fasteners 24 extends through and is fastened with the edge 223 of the upper floating shell 22 and the first flange 2122 of the plate structure 212. The fasteners 24 are utilized to enhance the sealing performance of the device, and the fasteners 24 can be bolts, clips, or other mechanical fastening member.

Figure 7:
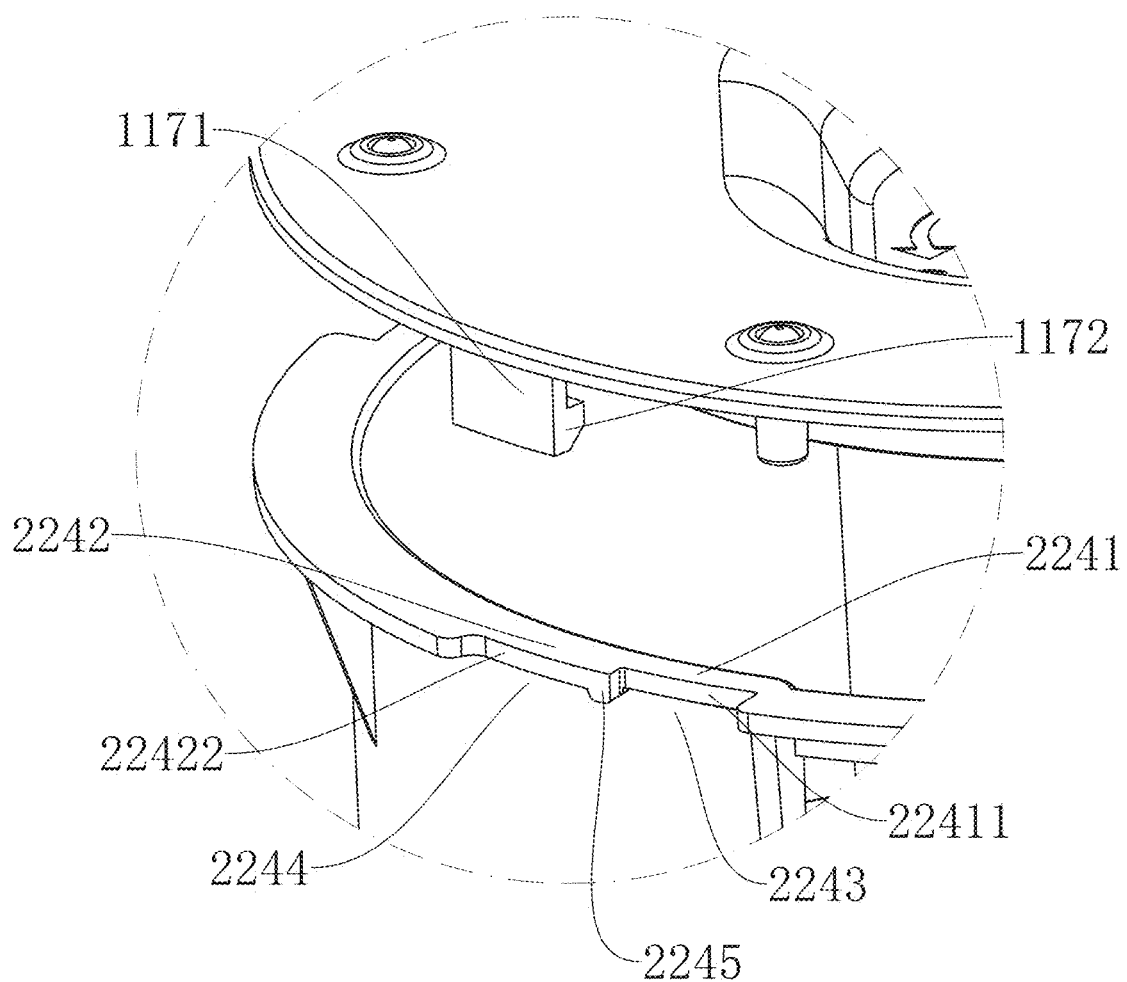
FIG. 7 is an enlarged view of a portion A shown in FIG. 4.

In an embodiment of the present disclosure, as shown in FIG. 4 and FIG. 7, the top end 116 of the housing 11 extends outwardly in a horizontal direction to form a second flange 1162. The second flange 1162 provides an extended connection area, allowing the upper floating shell 22 to be connected to the housing 11 stably. The second flange 1162 is provided with at least one first connecting member 118, and the edge of the upper floating shell 22 is provided with at least one second connecting member 225. Specifically, the first connecting member 118 may be either a snap slot 224 or a snap 117, and the second connecting member 225 is configured to correspond to the first connecting member 118, such that the second connecting member 225 is either a snap 117 or a snap slot 224, the snap slot 224 and the snap 117 are detachably connected with each other. Thus, through the engagement between the snap slot 224 and snap 117, a firm connection between the floating assembly 2 and the housing 11 is achieved, and enabling easier installation and detachment. It should be understood that the upper floating shell 22 and the housing 11 may also be detachably connected through other structures, such as a threaded connection. A first notch 2243 and a second notch 2244 are defined along the second flange 1162. The first notch 2243 and the second notch 2244 are defined adjacently, thereby providing a first rim 2241 and a second rim 2242 on the second flange 1162. The first notch 2243 is located on a first outer side 22411 of the first rim 2241, and the second notch 2244 is located on a second outer side 22422 of the second rim 2242. The width of the first notch 2243 is greater than the width of the second notch 2244. Correspondingly, the width of the first rim 2241 is smaller than the width of the second rim 2242. A guiding step 2245 is arranged between the first rim 2241 and the second rim 2242. The snap 117 includes a protrusion portion 1172 and an elastic portion 1171, the guiding step 2245 protrudes downward to form an arc-shaped guiding surface, which is configured to guide the protrusion portion 1172 of the snap 117 from the first notch 2243 to the second rim 2242. The elastic portion 1171 of the snap 117 is configured as a sheet-shape structure, allowing an elastic deformation of the elastic portion 1171, and the protrusion portion 1172 is arranged on the elastic portion 1171. When installing, the protrusion portion 1172 aligns with and passes through the first notch 2243, and the elastic portion 1171 does not deform, as the user rotates the upper floating shell 22, enabling the protrusion portion 1172 to abut against the guiding step 2245, allowing the elastic portion 1171 to deform, enabling the protrusion portion 1172 to pass over the guiding step 2245 and latch onto the second rim 2242. When detaching, the user can rotate the upper floating shell 22 in a reverse direction, causing the protrusion portion 1172 to pass over the guiding step 2245 and return to the position of the first notch 2243, in this way, the user can lift upwardly and remove the floating assembly 2.

In an embodiment of the present disclosure, as shown in FIG. 5, the scum removal device includes a handle 25, the handle 25 includes a first concave portion 251 and a second concave portion 252 that are indented into the upper floating shell 22. A ridge 253 is arranged between the first concave portion 251 and the second concave portion 252, facilitating the user to grip and rotate the handle 25, thereby enabling the installation, detachment or adjustment of the floating assembly 2 more convenient. In another embodiment, the handle 25 may also be configured as a protruding structure, allowing the user to operate by dragging.

Figure 10:
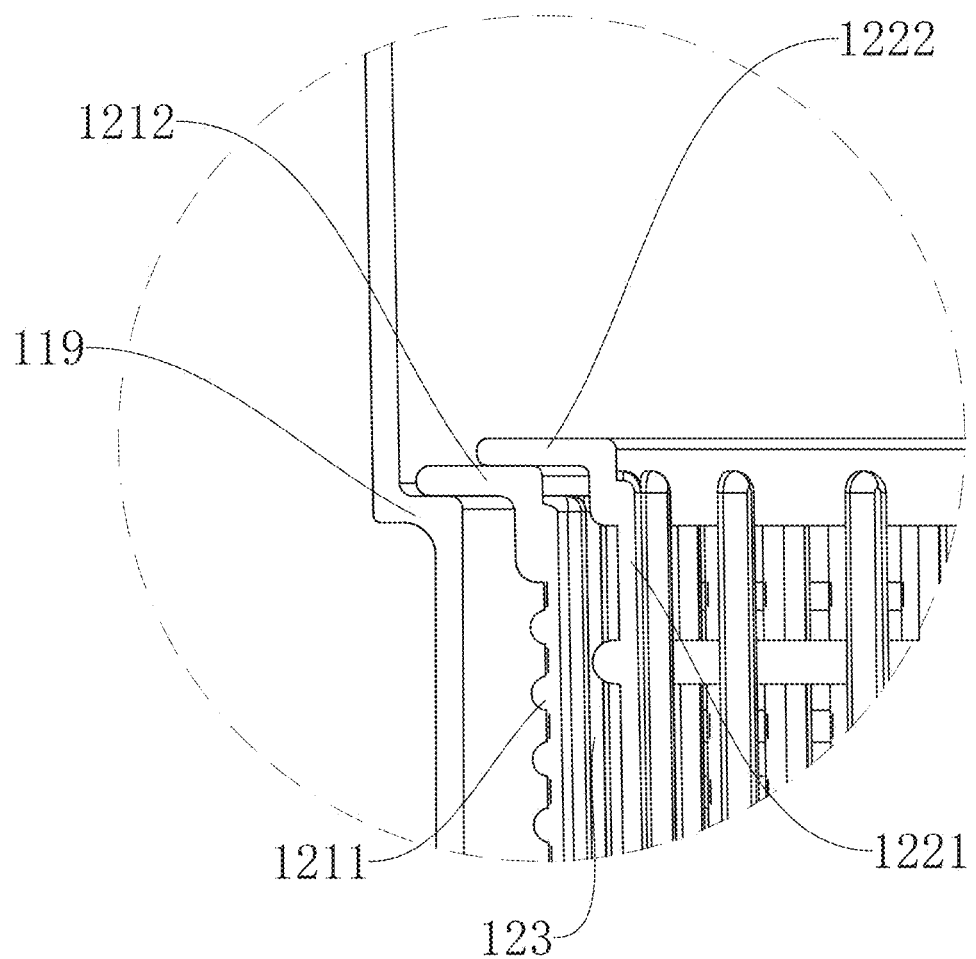
FIG. 10 is an enlarged view of a portion B shown in FIG. 9.

In an embodiment of the present disclosure, as shown in FIG. 9 and FIG. 10, the filter structure 12 includes a filter frame 121, and the filter frame 121 includes a first frame body 1211 and a first frame border 1212. The first frame body 1211 is configured as a barrel-shaped structure, used to capture solid impurities in the water 6 and allowing filtered water to flow through. An inner surface of the side wall 113 of the housing 11 is arranged with a stepped surface 119, the first frame border 1212 is mounted on the stepped surface 119, allowing the filter frame 121 to be easily detached and cleaned, simplifying maintenance of the device. The first frame body 1211 is spaced apart from the housing 11 to form a drainage gap 125, the drainage gap 125 ensures that the filtered water can be discharged quickly, improving efficiency of filtration.

Figure 13:
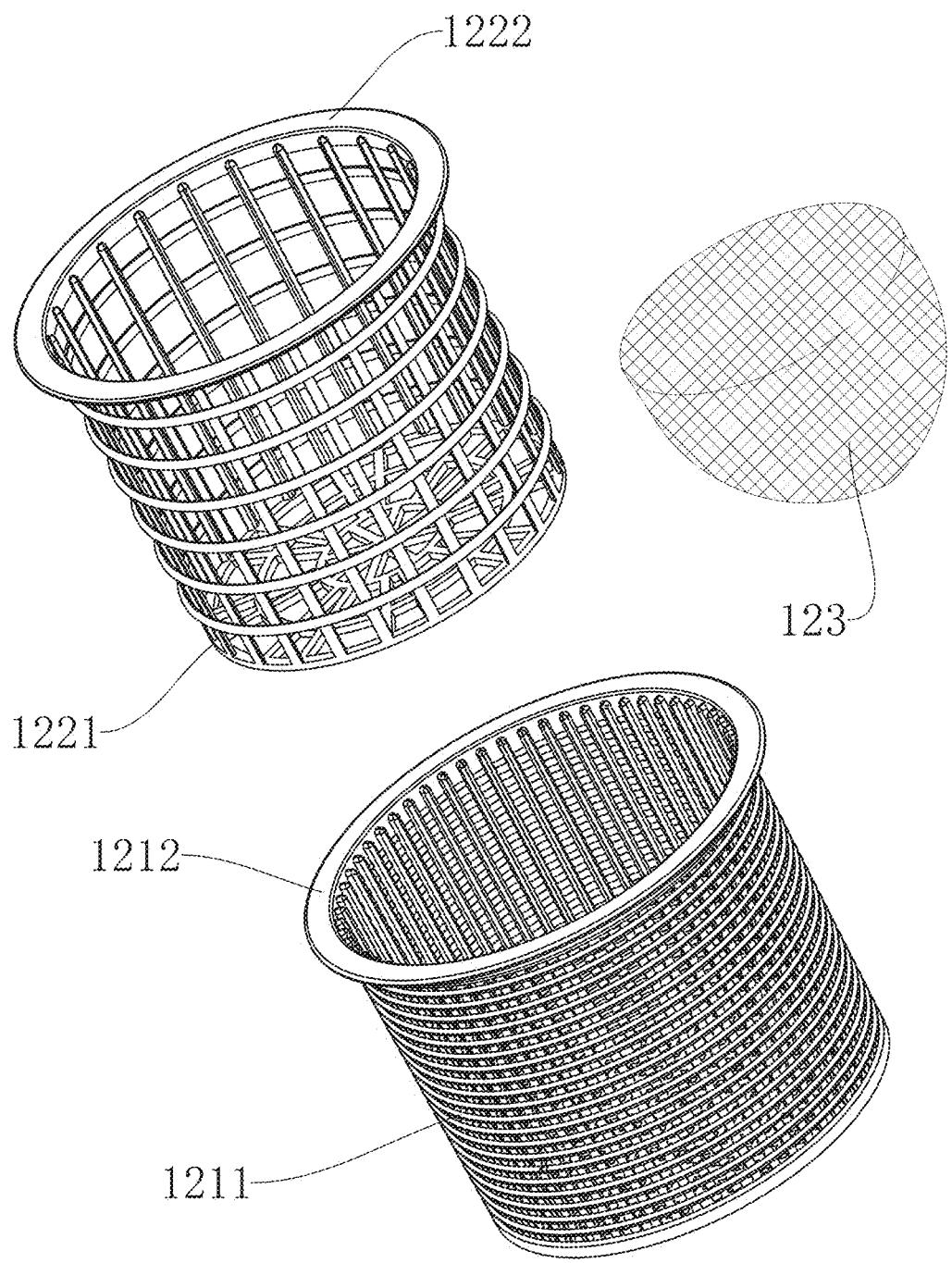
FIG. 13 is an exploded view of a filter structure according to an embodiment of the present disclosure.
Figure 14:
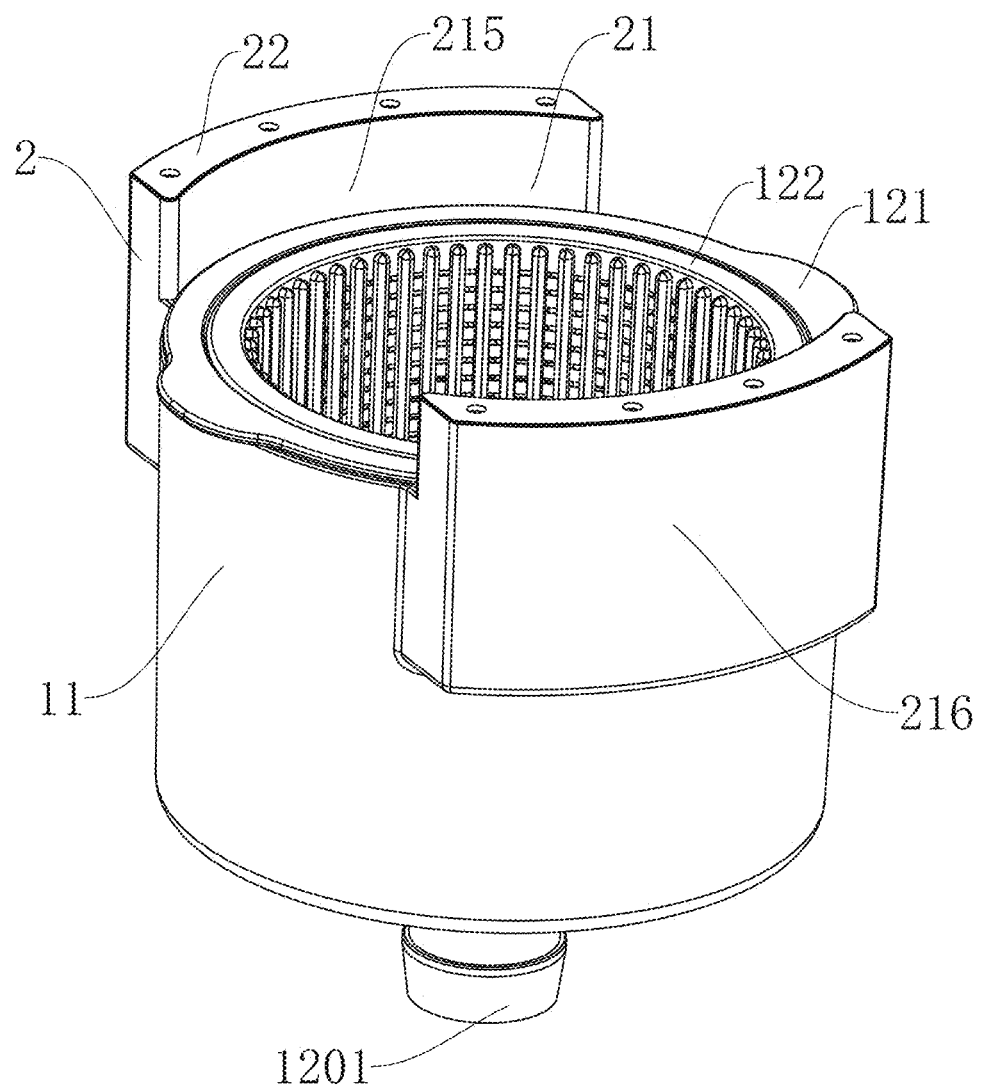
FIG. 14 is a fourth schematic view of the scum removal device according to an embodiment of the present disclosure.
Figure 15:
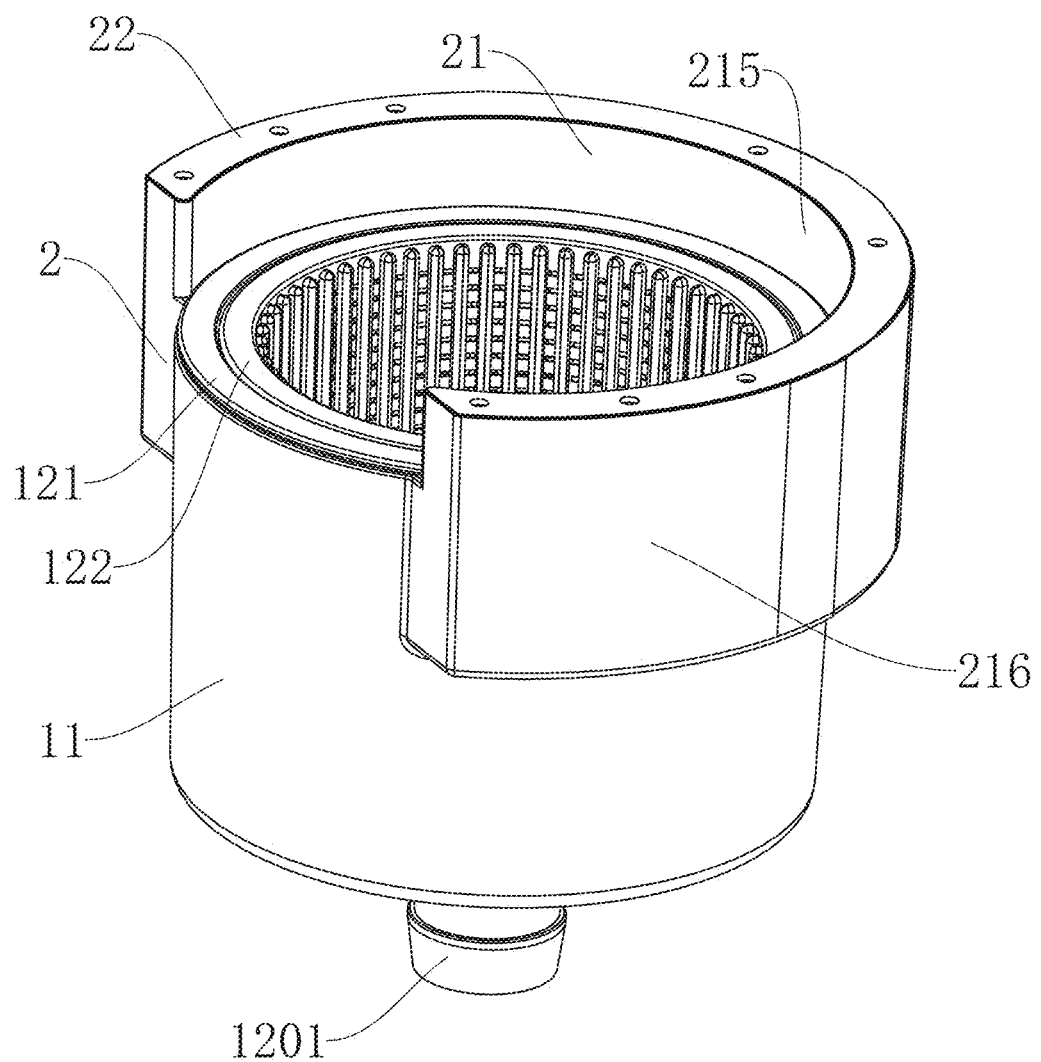
FIG. 15 is a fifth schematic view of the scum removal device according to an embodiment of the present disclosure.
Figure 16:
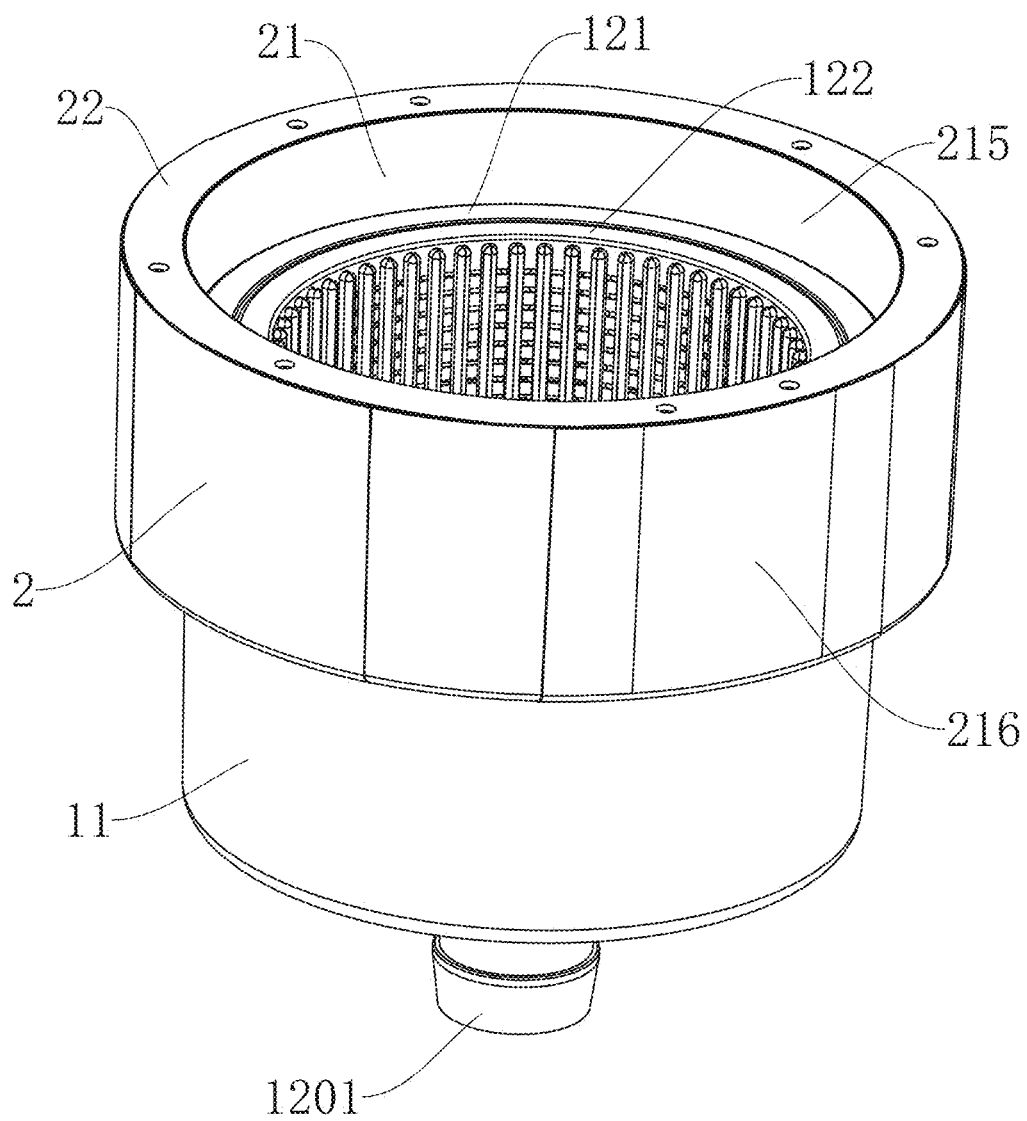
FIG. 16 is a sixth schematic view of the scum removal device according to an embodiment of the present disclosure.
Figure 17:
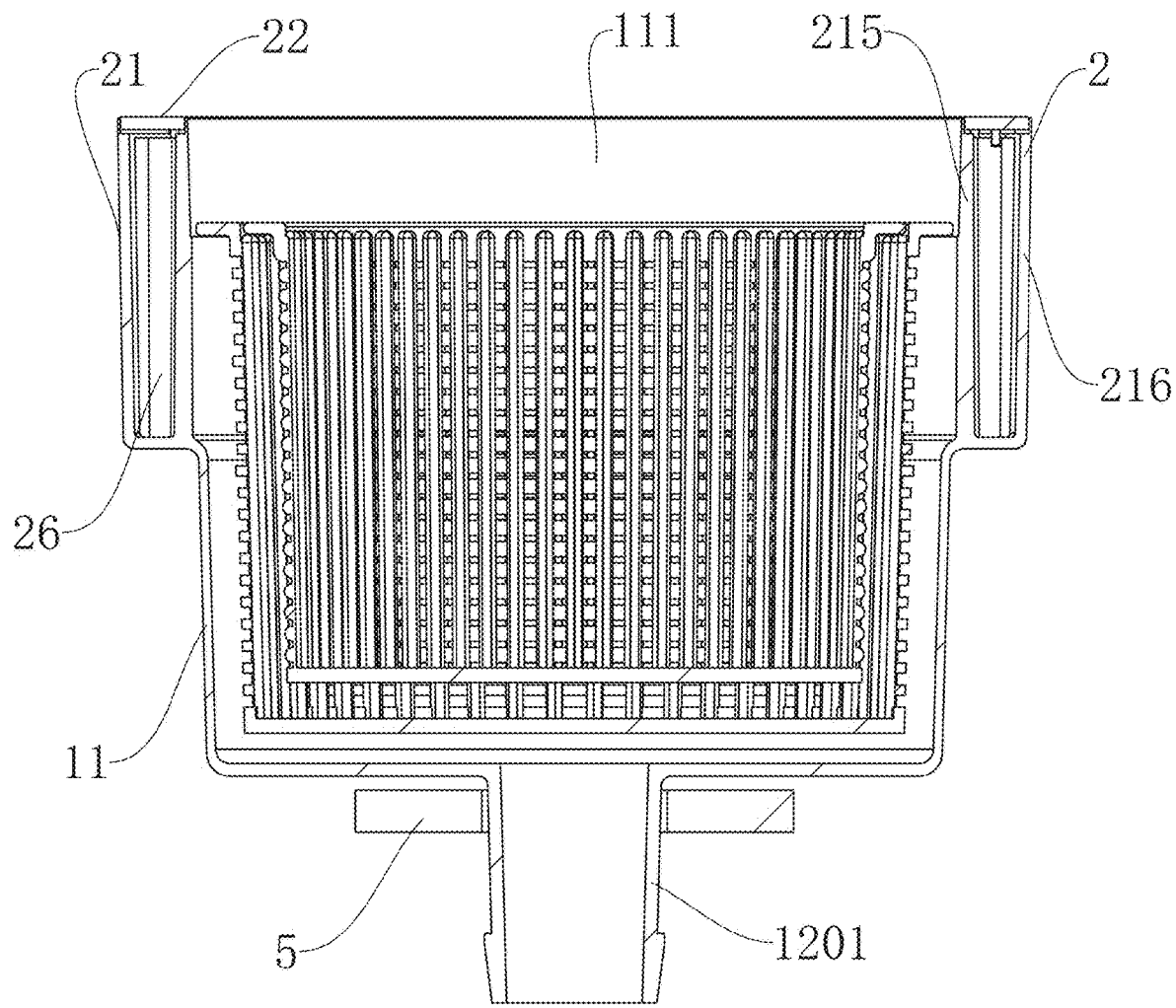
FIG. 17 is a third sectional schematic view of the scum removal device according to an embodiment of the present disclosure.

In an embodiment of the present disclosure, as shown in FIG. 10 and FIG. 13, the filter structure 12 includes an expansion frame 122, the expansion frame 122 includes a second frame body 1221 and a second frame border 1222, the second frame border 1222 is configured as a barrel-shaped structure with multiple mesh openings 124, a flexible filter mesh 123 is arranged between the filter frame 121 and the expansion frame 122. The flexible filter mesh 123 may be a disposable filter mesh that made of fabric, enabling a property of deformability. The second frame body 1221 is arranged within the first frame body 1211 and is closely contacted with the first frame body 1211, with the second frame border 1222 being supported by the first frame border 1212. The flexible filter mesh 123 is arranged between the filter frame 121 and the expansion frame 122, thereby the holes of the flexible filter mesh 123 may be expanded, enabling the water 6 flow to sufficiently contact with the flexible filter mesh 123 when passing through, enhancing the efficiency of filtration. The expansion frame 122 and the flexible filter mesh 123 are provided to capture finer impurities, thereby improving the filtration efficiency of the entire device.

Figure 11:
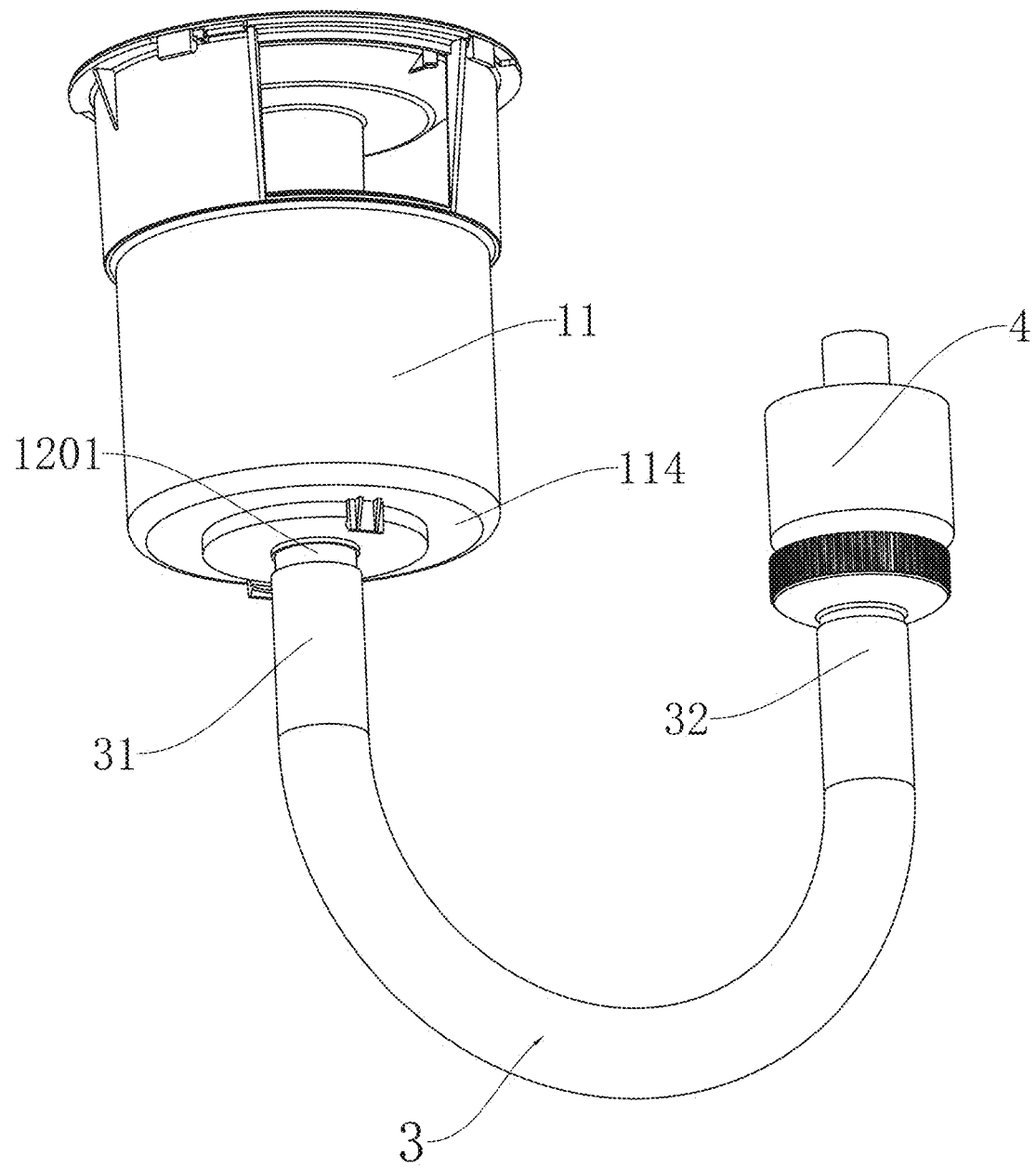
FIG. 11 is a third schematic view of the scum removal device according to an embodiment of the present disclosure.

In an embodiment of the present disclosure, as shown in FIG. 9 and FIG. 11, an outlet port 120 is defined in the side wall 113 or the bottom surface 114 of the housing 11, and the outlet port 120 is positioned on a center of the bottom surface 114. The outlet port 120 is equipped with a pipe connector 1201, and connected with a pipe 3 and a pump 4. The pipe 3 includes an inlet end 31 and an outlet end 32, the inlet end 31 is communicated with the pipe connector 1201, ensuring that the filtered water can flow into the pipe 3 smoothly; the outlet end 32 is communicates with the pump 4, the water 6 is pumped out of the pipe 3 by the pump 4 to complete circulation flow of the water 6. The scum removal device not only is able to effectively remove the scum in the water 6, but also can achieve the circulation flow of the water 6 through the pipe 3 and the pump 4, enhancing the efficiency and effect of scum removal.

Figure 18:
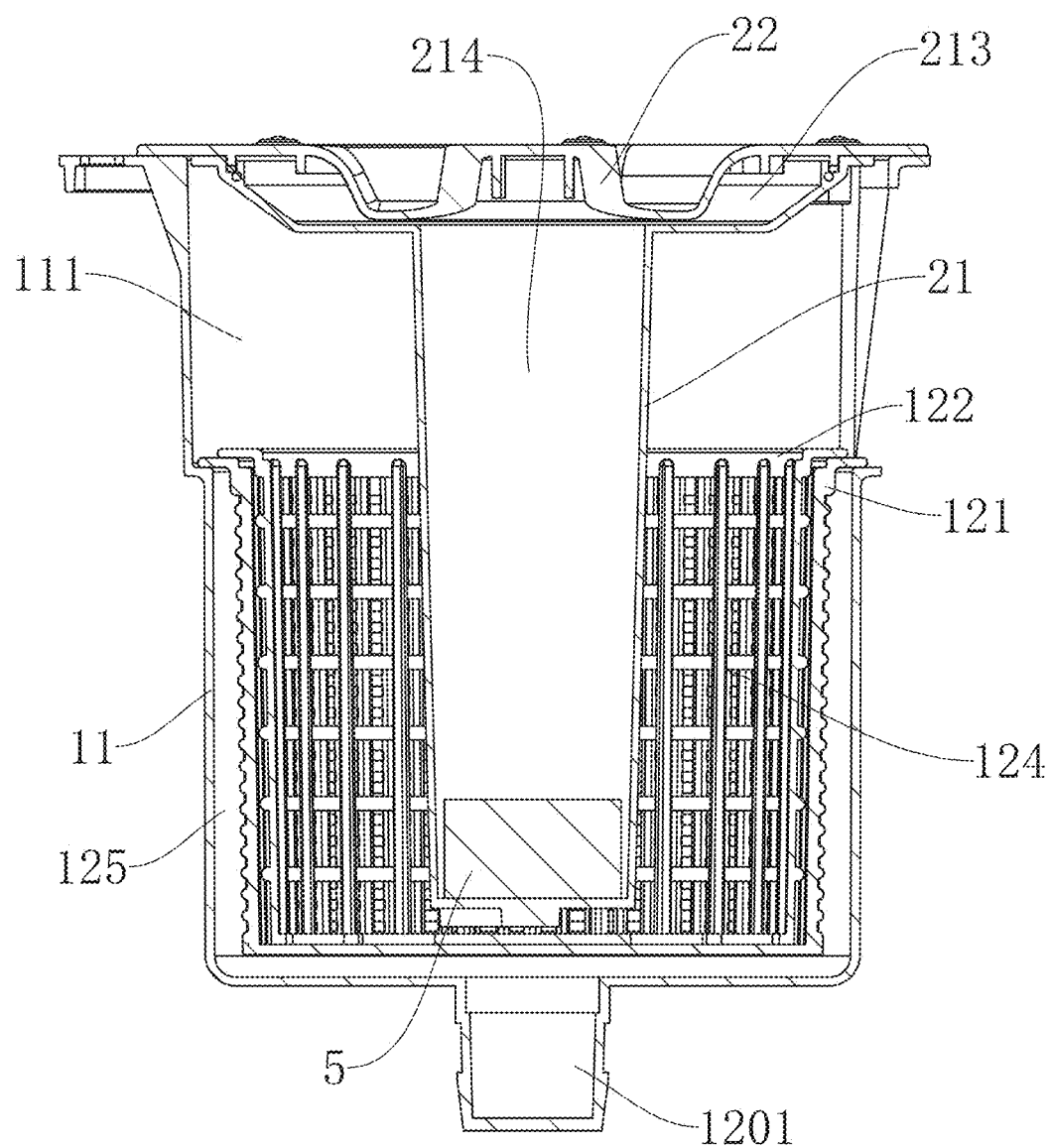
FIG. 18 is a fourth sectional schematic view of the scum removal device according to an embodiment of the present disclosure.

As shown in FIG. 2, FIG. 8 and FIG. 18, the scum removal device includes a counterweight element 5 installed on the scum removal body 1. In some embodiments, the counterweight element 5 in the scum removal device is configured as a disc structure, enabling the weight to be evenly distributed, thereby ensuring a stable counterweight effect of the scum removal device. The center of the counterweight element 5 defines an opening, and the pipe connector 1201 passes through the opening of the counterweight element 5. The center of the counterweight element 5 is positioned on the central axis 1203 of housing 11, ensuring that the gravity center of the counterweight element 5 coincides with the gravity center of the scum removal body 1 on the same vertical line, thereby contributing to keep the balance of the scum removal device and minimizing rotation or tilting of the device in the water 6. In another embodiment, the counterweight element 5 is positioned inside the floating chamber 26. The counterweight element 5 is located on the bottom of the first floating chamber 214, such that additional accessories for fixing the counterweight element 5 can be omitted. Placing the counterweight element 5 in the first floating chamber 214 can simplify the overall structure of the scum removal device. The counterweight element 5 is capable of adjusting the stability and vertical suspension of the scum removal device. The counterweight element 5 is located on or substantially on the vertical line that passes through a gravity center of the scum removal body 1. In addition, to maintain the balance of the scum removal device, the gravity center of the counterweight element 5 is positioned below the buoyancy center of the floating assembly 2, that is, the buoyancy center is higher than the gravity center of the counterweight element 5, thereby enabling the scum removal device to maintain a vertical suspended state effectively.

In an embodiment of the present disclosure, as shown in FIG. 2, the bottom surface 114 is arranged with multiple clipping hooks 1202. Two clipping hooks 1202 are oppositely arranged and positioned at an interval from each other, each of the clipping hook 1202 are elastic, thereby enabling to clip the counterweight element 5 through an elastic deformation, allowing the counterweight element 5 to be installed or removed with ease. In order to accommodate actual needs during use and to match different environments of the water 6, the counterweight element 5 can be replaced with different weights, or be removed from the device. In addition, the counterweight element 5 can also be fixed to the housing 11 by fasteners, such as pins or bolts that pass through the counterweight member 5, thereby improving reliability of the device.

In an embodiment of the present disclosure, as shown in FIG. 1, on an external surface of the side wall 113 of the housing 11, above water surface 61, is arranged with a boss 1204, the boss 1204 defines a through hole 1205. The scum removal device may move due to the wave of the water 6 when floating, to prevent above movement, one end of a rope can be threaded through the through hole 1205 and secured, with the other end of the rope being fixed to the shore of the water 6.

In another embodiment of the present disclosure, as shown in FIG. 14 to FIG. 17, the floating assembly 2 is arranged outside the housing 11, and the floating assembly 2 is arranged to surround the housing 11. The floating assembly 2 may be configured with one or multiple arcuate structures, and each arcuate structure has a floating chamber 26. In some embodiments, an upper portion of the arcuate structure is positioned higher than the housing 11, and the arcuate structures together define the inlet port 112, thereby preventing the scum that enters the inlet port 112 from flowing to any direction other than the inlet port 112 during the water 6 waving. When multiple arcuate structures are provided, the multiple arcuate structures are evenly distributed around the housing 11 to ensure the housing 11 to be symmetrical, in this way, the scum removal body 1 is able to remain in a vertical suspended state stably. In addition, the floating assembly 2 may be configured as an annular structure, with the floating chamber 26 defined inside the annular structure. In some embodiments, an upper portion of the annular structure is positioned higher than the housing 11, and the inlet port 112 is defined at the top end of the annular structure. The floating assembly 2 with annular structure can simplify the adjustment of the buoyancy center of the floating assembly 2. The upper floating shell 22 and the lower floating shell together define the floating chamber 26 of the arcuate structure or the annular structure, The lower floating shell 21 is detachably and sealably connected to the upper floating shell 22 by fasteners. The lower floating shell 21 includes an inner floating wall 215 positioned adjacent to the housing 11, and an outer floating wall 216 enclosing the inner floating wall 215. In some embodiments, the floating assembly 2 and the housing 11 are integrated formed with each other, in this way, a portion of the inner floating wall 215 configures a part of the housing 11, thereby simplifying the structure of the scum removal device.

Obviously, the embodiments described above are only a part of the embodiments of the present disclosure, and not all of them. The accompanying drawings give some embodiments of the present disclosure, but do not limit the patentable scope of the disclosure, which may be realized in many different forms. Rather, these embodiments are provided for the purpose of providing a more thorough and comprehensive understanding of the present disclosure. Although the present disclosure has been described in detail with reference to the foregoing embodiments, it is still possible for a person skilled in the art to modify the technical solutions recorded in the foregoing specific embodiments or to make equivalent substitutions for some of the technical features therein. Any equivalent structure made by utilizing the contents of the specification and the accompanying drawings of the present disclosure, directly or indirectly applied in other related technical fields, are all the same within the scope of the patent protection of the present disclosure.

What is claimed is:

1. A scum removal device, configured to be placed inside water, the scum removal device comprising:
 a scum removal body, comprising a housing and a filter structure, wherein the housing defines a filtering chamber therein, and the housing has an inlet port and an outlet port, the inlet port and the outlet port respectively communicates with the filtering chamber, and the filter structure is arranged in the filtering chamber;
 a floating assembly, arranged on the housing, wherein the floating assembly defines a floating chamber, and the floating chamber is configured to enable the housing to float in the water;
 wherein, when the housing floats in the water, at least a portion of the inlet port is positioned below a water surface of the water;
 wherein the floating chamber comprises: a first floating chamber that extends along a depth direction of the water; and a second floating chamber that extends along a direction substantially perpendicular to the depth direction of the water.

2. The scum removal device according to claim 1, wherein a buoyant center of the floating assembly is located on or substantially on a vertical line that passes through a gravity center of the scum removal body.

3. The scum removal device according to claim 1, wherein a side wall and a bottom surface cooperatively form the housing, and the inlet port is defined in the side wall.

4. The scum removal device according to claim 1, wherein the first floating chamber extends into the filtering chamber.

5. The scum removal device according to claim 1, wherein the first floating chamber communicates to the second floating chamber.

6. The scum removal device according to claim 1, wherein the housing is configured as a barrel-shaped structure, and the first floating chamber extends along a central axis of the housing.

7. The scum removal device according to claim 1, wherein the filter structure comprises a filter frame that defines a plurality of mesh openings, a drainage gap is defined between the filter frame and the housing.

8. The scum removal device according to claim 7, wherein the filter structure further comprises an expansion frame and a flexible filter mesh, the expansion frame defines a plurality of mesh openings, and the expansion frame is mounted inside the filter frame, the flexible filter mesh is arranged between the filter frame and the expansion frame to expand the flexible filter mesh.

9. A scum removal device, configured to be placed inside water, the scum removal device comprising:
 a scum removal body, comprising a housing and a filter structure, wherein the housing defines a filtering chamber therein, and the housing has an inlet port and an outlet port, the inlet port and the outlet port respectively communicates with the filtering chamber, and the filter structure is arranged in the filtering chamber;
 a floating assembly, arranged on the housing, wherein the floating assembly defines a floating chamber, and the floating chamber is configured to enable the housing to float in the water;
 wherein, when the housing floats in the water, at least a portion of the inlet port is positioned below a water surface of the water;
 wherein the floating assembly comprises an upper floating shell and a lower floating shell, the upper floating shell and the lower floating shell together define the floating chamber, the upper floating shell covers the housing, the lower floating shell extends into the filtering chamber.

10. The scum removal device according to claim 9, wherein the lower floating shell comprises a columnar structure, a first floating chamber is defined inside the columnar structure, and the columnar structure extends into the filtering chamber.

11. The scum removal device according to claim 10, wherein the lower floating shell further comprises a plate structure, the columnar structure comprises a connecting end, the plate structure surrounds the connecting end and extends laterally away from the connecting end, the upper floating shell is sealingly connected with the plate structure, and a second floating chamber is defined between the upper floating shell and the plate structure.

12. The scum removal device according to claim 11, wherein the first floating chamber communicates to the second floating chamber.

13. The scum removal device according to claim 11, wherein the floating assembly comprises a sealing member, the upper floating shell is arranged with an annular protrusion on a side facing the plate structure, and the plate structure defines a sealing groove that is mated with the annular protrusion, the annular protrusion presses the sealing member into the sealing groove.

14. The scum removal device according to claim 11, wherein the floating assembly further comprises a plurality of fasteners, the plate structure has a first flange, each of the plurality of fasteners extends through and is fastened with the upper floating shell and the first flange.

15. The scum removal device according to claim 9, wherein the housing is arranged with a first connecting member, the upper floating shell is arranged with a second connecting member, one of the first connecting member and the second connecting member is a snap slot, and the other one of the first connecting member and the second connecting member is a snap, the snap is detachably snapped in the snap slot.

16. The scum removal device according to claim 9, wherein the scum removal device further comprises a handle, the handle comprises a first concave portion and a second concave portion that are recessed inwardly in the upper floating shell, a ridge is formed between the first concave portion and the second concave portion and is configured to be gripped by a user.

17. A scum removal device, configured to be placed inside water, the scum removal device comprising:
 a scum removal body, comprising a housing and a filter structure, wherein the housing defines a filtering chamber therein, and the housing has an inlet port and an outlet port, the inlet port and the outlet port respectively communicates with the filtering chamber, and the filter structure is arranged in the filtering chamber;

a floating assembly, arranged on the housing, wherein the floating assembly defines a floating chamber, and the floating chamber is configured to enable the housing to float in the water;

wherein, when the housing floats in the water, at least a portion of the inlet port is positioned below a water surface of the water;

wherein the scum removal device comprises a counterweight element arranged on the scum removal body or inside the floating chamber, a bottom surface of the housing is arranged with a plurality of snap hooks, each of the plurality of snap hooks elastically engages the counterweight element and is detachably connected with the counterweight element.

18. The scum removal device according to claim 17, wherein a buoyant center of the floating assembly is located on or substantially on a vertical line that passes through a gravity center of the scum removal body, the counterweight element is located on the vertical line or substantially on the vertical line.

19. A scum removal device, configured to be placed inside water, the scum removal device comprising:

a scum removal body, comprising a housing and a filter structure, wherein the housing defines a filtering chamber therein, and the housing has an inlet port and an outlet port, the inlet port and the outlet port respectively communicates with the filtering chamber, and the filter structure is arranged in the filtering chamber;

a floating assembly, arranged on the housing, wherein the floating assembly defines a floating chamber, and the floating chamber is configured to enable the housing to float in the water;

wherein, when the housing floats in the water, at least a portion of the inlet port is positioned below a water surface of the water;

wherein the housing is arranged with a boss, the boss defines a through hole, the through hole is configured to enable a rope to pass through.

* * * * *